(12) United States Patent
Jahnke

(10) Patent No.: US 7,444,639 B2
(45) Date of Patent: Oct. 28, 2008

(54) LOAD BALANCED INTERRUPT HANDLING IN AN EMBEDDED SYMMETRIC MULTIPROCESSOR SYSTEM

(75) Inventor: Steven R. Jahnke, Tokyo (JP)

(73) Assignee: Texas Insturments Incorporated, Dallas, TX (US)

( * ) Notice: Subject to any disclaimer, the term of this patent is extended or adjusted under 35 U.S.C. 154(b) by 1058 days.

(21) Appl. No.: 10/256,697

(22) Filed: Sep. 27, 2002

(65) Prior Publication Data

US 2003/0120702 A1 Jun. 26, 2003

Related U.S. Application Data

(60) Provisional application No. 60/342,912, filed on Dec. 20, 2001.

(51) Int. Cl.
*G06F 9/46* (2006.01)
(52) U.S. Cl. ...................................... 718/105; 710/260
(58) Field of Classification Search ................. 710/260; 719/318; 718/105
See application file for complete search history.

(56) References Cited

U.S. PATENT DOCUMENTS

| | | | | |
|---|---|---|---|---|
| 5,867,706 A * | 2/1999 | Martin et al. | ............... | 718/105 |
| 5,905,897 A * | 5/1999 | Chou et al. | ................. | 710/260 |
| 6,189,065 B1 * | 2/2001 | Arndt et al. | ................. | 710/260 |
| 6,738,847 B1 * | 5/2004 | Beale et al. | ................. | 710/260 |
| 6,813,665 B2 * | 11/2004 | Rankin et al. | ............... | 710/260 |
| 2005/0102677 A1 * | 5/2005 | Gootherts | ................... | 718/105 |

* cited by examiner

*Primary Examiner*—Andy Ho
(74) *Attorney, Agent, or Firm*—Robert D. Marshall, Jr.; W. James Brady; Frederick J. Telecky, Jr.

(57) ABSTRACT

In an embedded symmetric multiprocessor (ESMP) system it is desirable to maintain equal central processing unit load balance. When an interrupt occurs, a single central processing receives the interrupt and then passes information to the central processing unit scheduling software. This software will in turn determine which central processing unit can best handle the interrupt. Because the scheduling software is able to determine which central processing unit handles the interrupt process, it can maintain central processing unit load balancing resulting in better system performance.

4 Claims, 3 Drawing Sheets

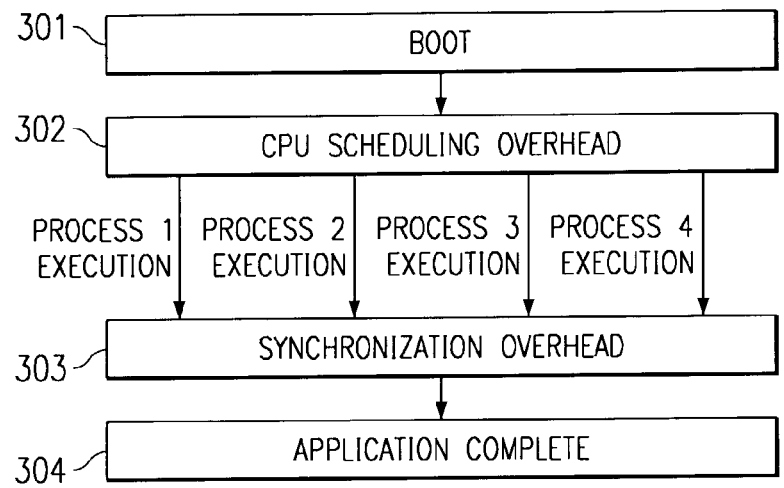
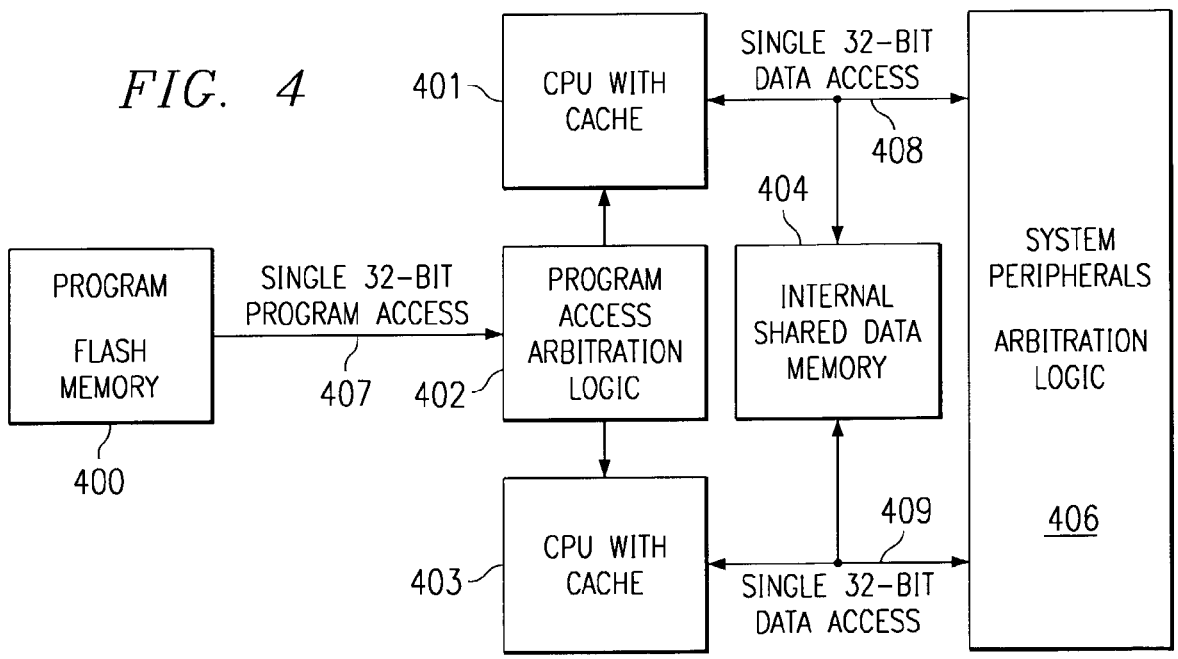

LOAD BALANCED INTERRUPT HANDLING IN AN EMBEDDED SYMMETRIC MULTIPROCESSOR SYSTEM

This application claims priority under 35 USC §119(e)(1) of Provisional Application No. 60/342,912, filed Dec. 20, 2001.

TECHNICAL FIELD OF THE INVENTION

The technical field of this invention is computer systems and more particularly multiprocessor computer systems.

BACKGROUND OF THE INVENTION

As each generation of silicon process technology has provided increasing integration density using smaller geometry transistors, central processing unit architects have continually debated how to use the additional device area to increase application performance. With smaller lower capacitance transistors, operating frequency has proportionally increased, yielding a direct performance gain. However, the access time of the memory function that holds the application program has not kept pace with the speed increases in the central processing unit. This is illustrated in FIG. 1. Memory speed improvement 101 has been gradual. Central processing unit speed improvement 102 has been more marked.

As a result, the performance gain that should be realizable from central processing unit operating frequency advances cannot be achieved without corresponding architectural enhancements in the central processing unit program memory path. As noted in FIG. 1, the speed difference between memory and processors has greatly increased in the past few years. As this gap continues to grow, the memory central processing unit interface will have an even greater effect on overall system performance. The traditional solution to reduce the effect of the central processing unit memory interface bottleneck is to use some form of memory hierarchy. In a general-purpose application processor, a cache system is employed that will allow the hardware at run time to keep copies of the most commonly used program elements in faster, internal RAM. In a more deeply embedded, performance sensitive application (such as a DSP), a form of tightly coupled memory is used that will allow the software to copy either a part of or all of the application program into on-chip RAM. In both of these techniques, the hardware architect gains system performance by the direct, brute force method of simply increasing clock frequency. This solution has proven successful because the performance gains by process technology alone have proved enough for current embedded applications, and there is no impact on application developers to migrate to a faster higher performance system.

It is important, for the clear exposition of processor techniques that follow, to define first the term embedded processor system (EPS) as employed here and as differentiated from a conventional non-embedded multi-chip processor system (MCPS). An embedded processor system includes a processor system integrated on a single chip having one or more central processing units plus a full complement of functional features and functional elements. This full complement of features, not normally included in conventional non-embedded multi-chip processor systems (MCPS). The MCPS is formed from one or more single chip central processing units and additional packaged devices performing memory, interface and peripheral circuits and these are assembled on a printed-wire board (PWB).

Additionally we define the embedded multiprocessor system (EMPS) as having multiple central processing units, complex memory architectures and a wide range of peripheral devices all fully integrated on a single chip. Such a system normally includes another special peripheral, an external memory interface (EMIF) coupled to a large amount of external memory. Central processing unit interactions and cache interactions on an embedded processor clearly involve more complex functionality when compared to a non-embedded processor device. Further, the embedded multiprocessor is typically used in a real-time environment leading to additional requirements for the coherent handling of interrupt operations and power consumption control.

The design methodologies used to support existing processors create a bottleneck in the ability for central processing unit designers to maximize frequency gain without extraordinary effort. At the same time the type of applications being considered for next generation embedded processors grows significantly in complexity. Application performance demand outpaces the ability of designers to efficiently provide performance through operating frequency alone at a reasonable development cost.

The disparity between embedded processor application performance requirements and performance gain through operating frequency alone has not gone unnoticed. In many new digital signal processors, two distinct paths have been used to affect increased system performance. The first technique is the use of enhanced central processing unit architectures having instruction level parallelism and the second technique is the use of system task specialization among different types of simpler but more specialized processors. These two paths are outlined below.

The Texas Instruments TMS320C6000 family of digital signal processors provides an example demonstrating the use of an effective central processing unit architecture to gain performance. Many of these devices use a form of instruction level parallelism (ILP) called very long instruction word (VLIW) to extract a performance gain by analyzing the code behavior at the most basic instruction level. The compiler effectively schedules unrelated instructions to be executed in two or more parallel processing units. This allows the processor to do work on more than one instruction per cycle. Since the instruction scheduling and analysis is done by the compiler, the hardware architecture can be simplified somewhat over other forms of instruction level parallelism ILP, such as super-scalar architectures.

Due to this emphasis on the compiler-based performance extraction, there is little impact on the task of application programmers. Application development can be done in a high-level language and be compiled normally. This is done in a non-ILP based system. This ease of application development, coupled with a performance gain without an operating frequency increase has resulted in the success of this form of enhancement. However, these benefits do not come without cost. Both the development effort in creating a new instruction set architecture (ISA), along with the compiler optimizations required are significant. In the future, once the underlying architecture is fixed, the only means of gaining additional performance is by increasing operating frequency.

Other Texas Instruments digital signal processors, the so-called OMAP devices and the TMS320C5441 provide examples of the technique of breaking the target application into fundamental domains and targeting a simpler processor to each domain. Based on system analysis, the system architect breaks the total application into smaller parts and puts together a separate programming plan for each central processing unit in place. In the past, this could have been done only at the board level, where a specialized processor would be targeted for a specific application task. However, the integration density offered by current process enhancements allows these specialized central processing units to be placed on a single die. This enables a tighter coupling between the processors. Fundamentally, the application developer writes code as if he or she was dealing with each processor as an independent platform.

The programmer must be cognizant of the hardware architecture and program each processor independently. Greater coupling between the integrated processors allows for a more efficient passing of data than at the board level. However, the application is primarily written with the focus on the separate processors in the system. Code reuse and porting is difficult even among the processors in the same system, because each processor is really the centerpiece of its subsystem. Each processor may have a different memory map, different peripheral set and perhaps even a different instruction set (such as OMAP). In applications that have very distinct boundaries, such as a cell phone, this method of extracting performance is unparalleled. Each part of the application can be targeted to an optimized processor and programmed independently.

Development efforts are reduced somewhat since a new instruction set is not required to gain performance. However, from an application development and road map perspective, this technique does not offer the ease of use that instruction level parallelism offers. In many applications, there is no clear line where to divide the work. Even when done, the system cannot easily use all the performance of each central processing unit. If one central processing unit is idle while another is very busy, it is difficult to readjust central processing unit loading once the code has been written. If tighter coupling between the system processors is desired, significant software overhead must be added to insure data integrity.

SUMMARY OF THE INVENTION

In a symmetric multiprocessor system it is desirable to maintain equal CPU load balancing throughout the system. When scheduling tasks occur, however, the operating system or boot-kernel cannot schedule exceptions in advance. These exception processes must be scheduled when the interrupt occurs. As a result, if many interrupts occur, or if the processes associated with an interrupt involve many clock cycles, the scheduler may not be able to optimize CPU load balancing.

When an interrupt occurs, a single CPU will first receive the interrupt and then pass the information to the CPU scheduling software. This software will in turn determine which CPU can best handle the interrupt. If the CPU identified is not the one handling the initial process, that CPU will cause a software interrupt to occur in the interrupt controller. The controller interrupt will, in turn, will initiate an interrupt in the CPU that was scheduled to handle the interrupt process. The scheduled CPU will then perform all tasks associated with the interrupt process.

Because the scheduling software is able to determine which CPU should handle the interrupt process, CPU load balancing can be maintained. This in turn will result in better system performance as a result of CPU load balancing.

BRIEF DESCRIPTION OF THE DRAWINGS

These and other aspects of this invention are illustrated in the drawings, in which:

FIG. 3 illustrates the execution time of plural processes by a multi-processor systems in accordance with the prior art;

FIG. 4 illustrates an example embedded symmetric multi-processing system to which the invention is applicable;

DETAILED DESCRIPTION OF PREFERRED EMBODIMENTS

Figure 1:
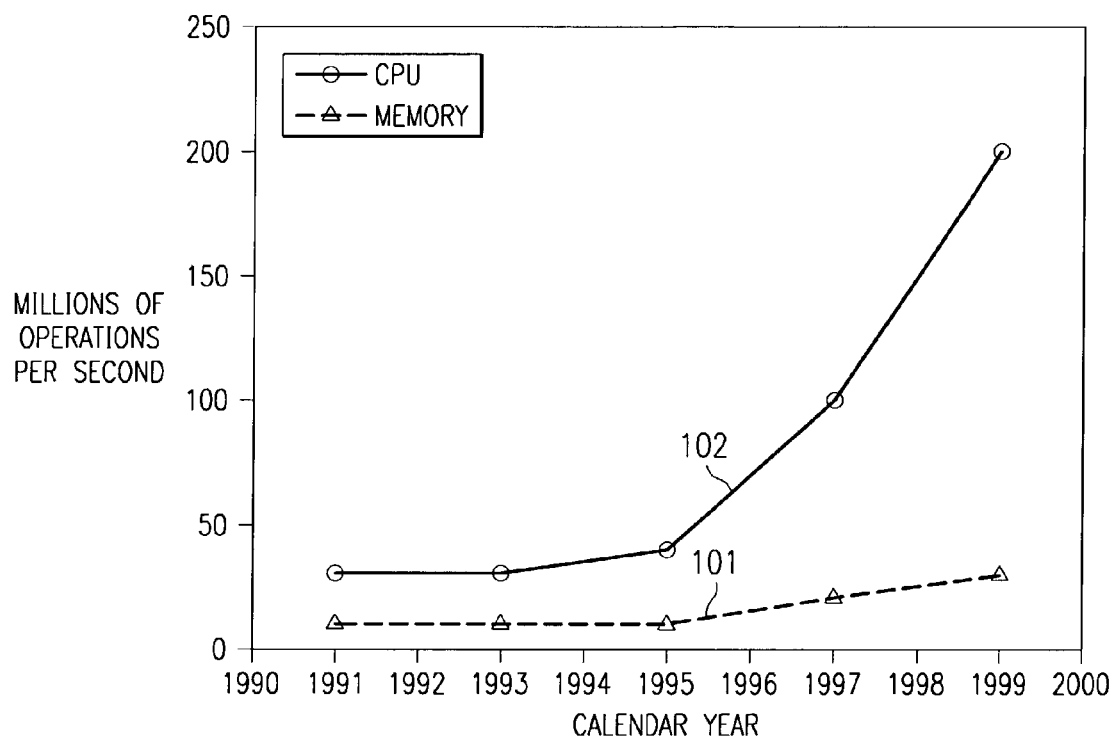
FIG. 1 illustrates the progress in speed performance of memory and central processor units in recent years according to the prior art.

The embedded symmetric multiprocessor system (ESMP) of this invention includes a powerful set of central processing unit-memory-peripheral functions densely integrated at the chip level. While some common multi-chip symmetric multiprocessor systems (MCSMP) are generally available at the board level now, the designer of MCSMP systems typically employs plural standard third or fourth generation central processing unit chips for the base processors. Two or more of these on standard processors are disposed on a mother-board and then connected by way of a commonly available bus interface device to a separate traffic controller and memory controller. Such systems use discrete interface and controller components and central processing unit-memory architectures at the board level. This combination of devices has a set of system interconnect requirements and concerns completely different from and often more troublesome than the embedded symmetric multiprocessor system (ESMP) of this invention. This invention has all interconnects of major importance implemented compactly at the chip level.

Conventional symmetric processor systems (CSMP) have been designed employing having two or more central processing units on the same die, cache architectures that include local unshared L1 caches for each central processing unit and generally an L2 cache shared by both central processing units. However, few if any conventional CSMP systems are available that have both the kind of primary memory normally present on the hard disc drive of a conventional desktop computer and include the full range of peripheral devices. We are labeling these conventional symmetric processor systems (CSMP) as non-embedded as they most often have simply a central processing unit-memory architecture with no peripheral system components. Processor designers have only recently initiated experimentation and research in the area of these higher complexity systems that include the full range of peripheral devices.

An embedded symmetric processor system (ESMP) includes the full complement of functional features and functional elements, such as peripheral functions and external memory interface, not contained in a conventional CSMP system. It contains integrated multiple central processing units with high complexity memory architectures plus peripherals (i.e. DMA, UART, USB functions), plus local system memory and perhaps an interface to external memory if a large amount of memory is required. The central processing unit interactions and cache interactions on an embedded central processing unit are similar but much more complex than the CSMP case. These interactions must comprehend the cache interfaces with on-chip system memory and peripheral interfacing. Since the embedded processor is often used in a real-time environment, interrupt operations and the manner of controlling and reducing power consumption are handled differently.

In summary, the basic difference between the conventional symmetric multiprocessor (CSMP) and the embedded symmetric multiprocessor (ESMP), is that the conventional CSMP is simply a computing processor while the embedded symmetric multiprocessor ESMP is an integrated system having one or more central processing units plus a full complement of peripherals. A non-embedded CSMP deals with a simpler central processing unit-cache interface with minimal concerns for what happens beyond. An embedded ESMP must resolve a greater complexity of system interactions and interfaces requirements.

Both single-processor, instruction-level parallelism ILP architectures and the multi-processor architectures increase system performance by taking advantage of parallelism but at different levels of abstraction. A single processor ILP architectures takes advantage of unrelated central processing unit instructions that can be executed concurrently. The multiprocessor approach takes this a step further and makes use of unrelated application fragments that can be run concurrently. The instruction-level parallelism (ILP) approach has a very tight coupling between parallel operating units (i.e. execution units inside the core) and is completely hardware and software controlled. As a result, the parallelism is invisible to the user. The multiprocessor approach has very loose coupling between parallel operating units (i.e. separate processors) with minimal hardware and software interference. As a result, the parallelism is not only visible to the user, but system performance gain is dependent upon efficient division of the application. In applications that run more than one software process, there resides another level of parallelism in-between these two extremes: process level parallelism.

This invention includes a software process level that seeks system performance gain in process level parallelism using multiple central processing units. When a program first boots, the kernel, which may be either part of a real time operating system (RTOS) or custom-developed boot code, will schedule which parts of the application will be executed at which time. Some processes are launched based on a conditional event, such as the completion of a previous process or external event. However most major processes have some degree of independence from one another in a multi-tasking environment. The supervisor code from either the operating system or the boot-code schedules central processing unit time for each process, based on its priority. It is at this central processing unit scheduling point that additional performance can be gained through the use of multiple central processing units.

Figure 2:
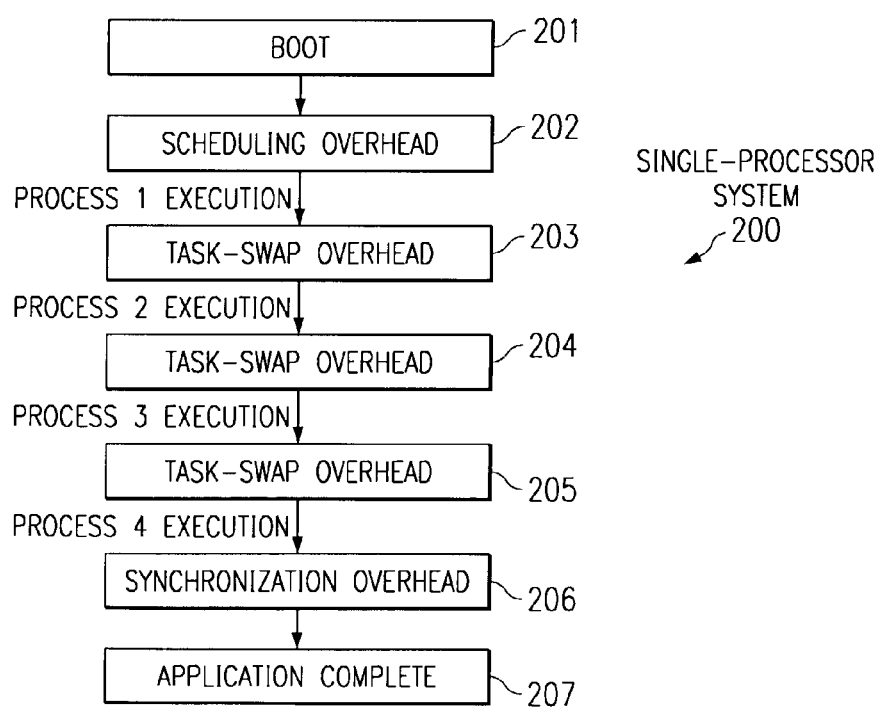
FIG. 2 illustrates the execution time of plural processes by single-processor in accordance with the prior art.

Instead of time-sharing all processes on a single central processing unit, the supervisor can split these processes among two or more central processing units. FIGS. 2 and 3 illustrate these two alternatives. FIG. 2 illustrates an example of the execution time for a complex process running on a single central processing unit system. FIG. 3 illustrates that same process running on a multiple central processing unit system. In these examples, four separate single processes are running.

On the single central processing unit system 200, each process is time shared on the single central processing unit. The operating system or boot kernel 201 begins the process. Initially there is some scheduling overhead 202. The single processor then executes processes 1, 2, 3 and 4 in sequence. Proceeding from one process to the next process adds some task-swap overhead 203, 204 and 205. There is synchronization overhead 206 and then the application is complete at 207.

On the multiple central processing unit system 300, the application begins with operating system or boot kernel 301. Initially there is some scheduling overhead 302. The single processor then executes processes 1, 2, 3 and 4 in parallel. There is synchronization overhead 303 and then the application is complete at 304.

Adding additional central processing units to execute parallel processes, however, does not come without risk. Parallelism is now found at the software process level, independent of the level at which the application programmer interacts. Writing an application for such a parallel system is much like writing an application for a single processor case. The application programmer is not concerned about when code will be scheduled to run. Only the operating system or boot-code scheduler takes that into account. This is a major benefit, since it is as easy to create applications on such a system as a single processor-based system and higher system performance is realizable. Only the operating system or boot-code programmer needs to be aware of the hardware. However this also presents unique challenges, since the application programmer is normally unaware of the hardware and the system must execute such code just as if it was made up of a single processor.

Any data shared between processes must be kept coherent. As a result, the software-processed based multiprocessor is less flexible in hardware than an application-division based multiprocessor. However, development on such a system is much easier and more scalable, allowing for greater degrees of parallelism and hence higher performance.

When hardware runs a software-process based multiprocessing solution it is required to keep shared data coherent. The application software written for a single-processor system must run correctly on a multiprocessor system. Through the use of symmetric multiprocessing (SMP), it is possible to satisfy both of these conditions. Conventional symmetric multiprocessing systems CSMP are commonly employed on desktop PCs (dual central processing units) and small-scale (4-way or 8-way) servers. Many of the same techniques can be used in an embedded application, but can be enhanced further by the tighter integration of an embedded central processing unit. Additional hardware can be employed to allow for better real-time determinism such as interrupts and peripheral management.

Symmetric multiprocessing derives its name from the premise that each central processing unit in the system behaves exactly the same as any another. All central processing units run the same instruction set, at the same frequency and all have access to all system resources. This is needed, because applications are written as if they are to be run on a single central processing unit. As a result, all central processing units that can run a process need to appear identical.

One of the greatest challenges to a symmetric multiprocessor system is in keeping data coherent. Since the operating system or boot-code scheduler will launch different processes on each processor, any data that is used by more than one process must be kept current. A central processing unit that changes a shared variable must have that change reflected in the other central processing units. This may be done by having a large shared memory. By definition such a large shared memory does not allow for any local data memory. For performance and data coherence reasons, a data cache must also be employed when the base central processing unit instruction set does not support multiprocessing.

The embedded symmetric multiprocessing ESMP architecture of this invention will not have any serial message passing. All data is kept in the shared memory and information is passed between processes in the form of shared variables. This is just the same as in the single-processor case, where the central processing unit will access the same memory locations for shared data between processes. However, in a multiprocessor model, shared-resources can be a bottleneck since only one central processing unit can have access to the data at a given time.

The greatest challenge from a data integrity viewpoint is making sure central processing unit registers are updated with any changes to the shared variables that may be stored. This is most conveniently done using good documentation and disciplined programming habits, declaring any variable or pointer that can be changed as a volatile type. This will force the central processing unit to load from main memory a new value into the register file any time the variable is used. However, since this is not a requirement in the single-processor case, it will cause a slight burden to the end application programmer in directly porting existing code. Changes to the compiler can also guarantee register coherence, since the compiler can generate code that will always reload data from main memory.

FIG. 4 illustrates a first generation 2-way embedded symmetric multi-processor ESMP architecture. A single flash memory 400 stores a single program stream. Both central processing units 401 and 403 receive their instructions from flash memory 400 via instruction bus 407 and program access and arbitration logic block 402. When an instruction cache miss occurs, arbitration logic 402 determines which processor has priority access to the flash memory 400. Both central processing units 401 and 403 receive their data likewise from the same source, internal shared data memory 404. All system resources are shared and visible to central processing units 401 and 403. Both central processing units 401 and 403 run the same instruction set and have identical organizations. Similarly, system peripherals and arbitration logic 406 is shared by both central processing units 401 and 403. Central processing unit 401 interacts with internal shared data memory 404 and systems peripheral arbitration logic block 405 via 32-bit data access bus 408. Central processing unit 402 interacts with internal shared data memory 404 and systems peripheral arbitration logic block 405 via 32-bit data access bus 409.

As illustrated in FIG. 4, program instructions are kept in a single external flash memory device 400. Alternately the instructions may be stored in an internal ROM, not shown. This is the same as the single-processor model. Since there is only one path to the instruction memory and each central processing unit 401 or 403 needs to access the program memory on nearly every cycle, the processors require an instruction cache for cycle performance reasons. This differs somewhat than a single-processor case, where the instruction cache is used due to variations in memory speed. Even if all of the program is kept internal to the device, an instruction cache near each central processing unit is needed. This prevents a performance bottleneck from occurring during program memory access arbitration. When both central processing units 401 and 403 suffer a cache miss, program access arbitration logic 402 will stall central processing unit based on hardware priority while the other central processing unit refills its cache line.

There are two distinct techniques for handling interrupts for embedded symmetric multiprocessor systems. The technique selected depends on the real-time application requirements. Since all interrupt handling and processing is done by the boot-kernel or operating system (stack setup, register saving, etc.), interrupt routines written for a single processor case will be directly portable to an embedded symmetric multiprocessor system. This may compromise real-time performance depending on the hardware architecture. It is preferable to execute all software processes associated with a particular interrupt on the same processor for performance concerns. As a result, a real-time embedded symmetric multiprocessor interrupt controller is defined that will allow the operating system or boot-kernel to decide to which CPU an interrupt should be driven.

Figure 5:
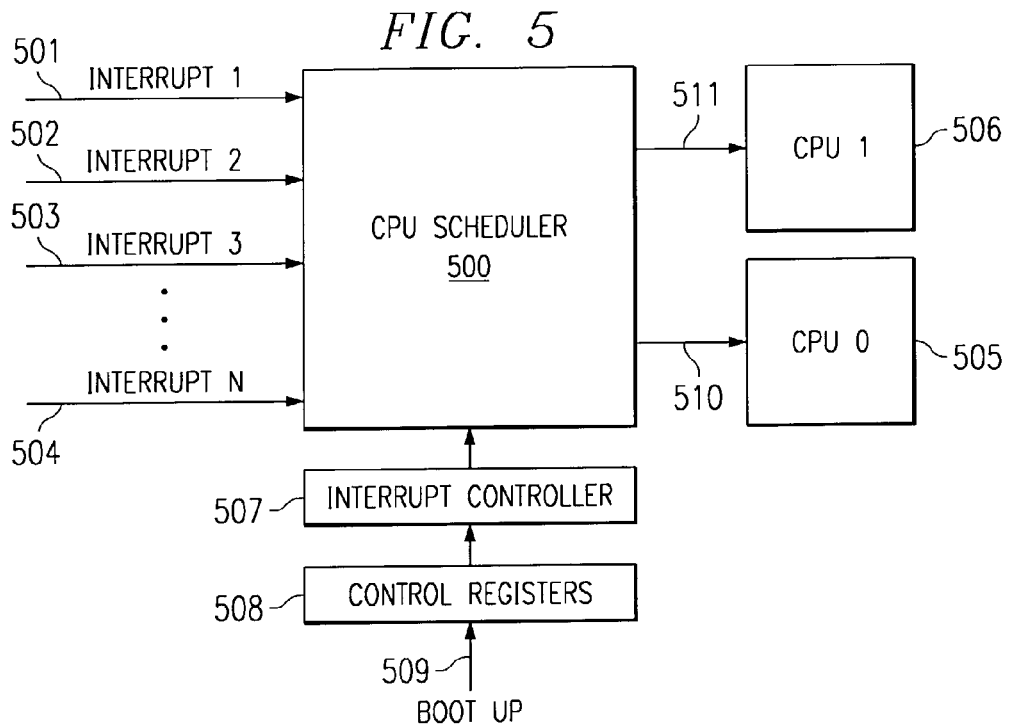
FIG. 5 illustrates in flow diagram form, the process of load balanced interrupt handling among central processing units in an embedded symmetric multi-processing system.

FIG. 5 illustrates a simplified real-time interrupt block diagram. There are four possible interrupt paths 501 through 504. Interrupt controller 507 would function identically for a single or a multiprocessor system. In a two processor system only one central processing unit, either CPU-0 505 or CPU-1 506, can be interrupted. All processes associated with that interrupt are run automatically on that central processing unit. No code scheduling is required.

When a system boot-up 509 occurs, the boot code will decide which interrupts go to which central processing unit by programming control registers 508. Control registers 508 pass this data to interrupt controller 507. When an interrupt is received, CPU scheduler 500 suspends the current task being run on the central processing unit handling that interrupt. This takes place via interrupt line 510 to CPU-0 506 or via interrupt line 511 to CPU-507 depending on the central processing unit selected to handle the interrupt. CPU scheduler 500 schedules all associated processes for the interrupt on the same processor. This technique has the benefit of handling the interrupt event in real-time. However, it may hurt system performance because one central processing unit may be too loaded with the additional forced scheduling of the interrupts. This can be mitigated by the operating system scheduler rescheduling processes on other central processing units. However, this rescheduling requires additional software overhead, potentially hurting system performance.

In another option the boot-code or operating system interprets the interrupt first, before launching the interrupt handling process. When an interrupt is received, it is sent to a predetermined processor. The scheduler then determines load balancing on the central processing units. The scheduler can spread the interrupt handling process across multiple central processing units just like scheduling a normal process. This technique has the benefit of requiring simpler hardware and providing better central processing unit load balancing that the prior technique. However, this technique requires more software overhead and takes more time degrading real-time response.

Figure 6:
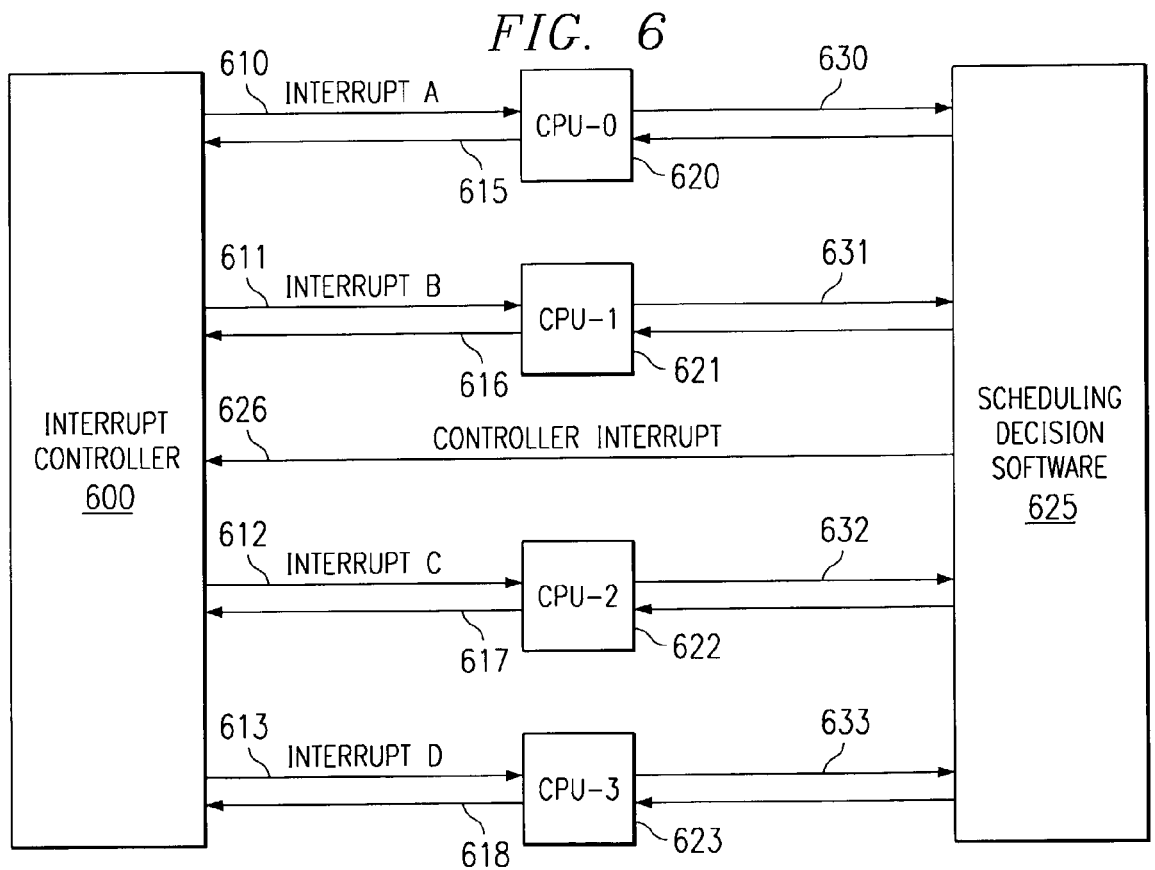
FIG. 6 illustrates further the details of the load-balanced interrupt handling process of this invention for central processing units in an embedded symmetric multiprocessing system.

FIG. 6 illustrates a simplified process driven interrupt scheme. As an example, when interrupt A 610 first occurs, CPU-0 620 will be interrupted. It will pass this information via signal 630 to the scheduling decision software 625. Based on current central processing unit loading, scheduling decision software 625 will decide which central processing unit should handle the interrupt. These loadings are provided to scheduling decision software 625 via paths 630, 631, 632 and 633. Similarly, interrupt B is initially taken by CPU-1 621, interrupt C is initially taken by CPU-2 622 and interrupt D is initially taken by CPU-3 623. The scheduling decision software 625 will then program interrupt controller 600 via controller interrupt path 626 to cause an interrupt to the selected central processing unit via the corresponding one of interrupt A line 610, interrupt B line 611, interrupt C line 612 or interrupt C line 613. When complete, the cental processing unit signals interrupt controller 600 via the corresponding completion line 615, 616, 617 or 618. Note that scheduling system software 625 may be running on any of CPU-0 620, CPU-1 621, CPU-2 622 or CPU-3 623, or split among them.

Referring again to FIG. 6, suppose CPU-2 622 is selected to handle the interrupt. Interrupt controller 600 signals an interrupt to CPU-2 622 via interrupt C path 612. CPU-2 622 handles the interrupt routine. Upon completion, CPU-2 622 signals interrupt controller 600 via completion line 617.

This technique has the benefit of dynamically balancing central processing unit loadings at the expense of increased interrupt response time.

What is claimed is:

1. A data processing method employing a plurality of central processing units, said method comprising the steps of:
   scheduling tasks among said plurality of central processing units;
   receiving an external interrupt on a predetermined central processing unit;
   determining current loading of each of said plurality of central processing units; and
   scheduling interrupt tasks among said plurality of central processing units based upon said current loading of each of said plurality of central processing units to dynamically balance loading among said plurality of central processing units including dividing servicing a current interrupt into a plurality of tasks and distributing different ones of said plurality of tasks of said current interrupt to different ones of said plurality of central processing units.

2. A data processing method employing a plurality of central processing units, said method comprising the steps of:
   scheduling tasks among said plurality of central processing units;
   receiving an external interrupt on a predetermined central processing unit including mapping interrupt sources to corresponding central processing units;
   determining current loading of each of said plurality of central processing units; and
   scheduling interrupt tasks among said plurality of central processing units based upon said current loading of each of said plurality of central processing units to dynamically balance loading among said plurality of central processing units including upon receipt of said external interrupt one of said corresponding central processing units passing information of said external interrupt to interrupt scheduling decision software to schedule interrupt tasks of said external interrupt to one or more of said plurality of central processing units.

3. The data processing method of claim 2, wherein:
   said step of scheduling tasks among said plurality of central processing units including dividing said interrupt scheduling decision software into a plurality of tasks and distributing different ones of said plurality of tasks of said interrupt scheduling decision software to different ones of said plurality of central processing units.

4. The data processing method of claim 2, wherein:
   said step of mapping interrupt sources to corresponding central processing units includes programming control registers to determine which interrupt source is mapped to which corresponding central processing unit.

* * * * *